428-1
5/10/77    XR    4,022,93

United States Patent [19]
Miller

[11] 4,022,934
[45] May 10, 1977

[54] MEANS FOR INDUCING PERPENDICULAR ALIGNMENT OF A NEMATIC LIQUID CRYSTAL ON A COATED SUBSTRATE

[75] Inventor: Leroy J. Miller, Canoga Park, Calif.

[73] Assignee: Hughes Aircraft Company, Culver City, Calif.

[22] Filed: Apr. 21, 1975

[21] Appl. No.: 570,305

[52] U.S. Cl. .................. 427/126; 427/58; 427/344; 428/1; 350/160 LC; 134/2

[51] Int. Cl.$^2$ .................. C09K 3/34; B05D 3/10

[58] Field of Search ............ 428/1; 350/160 LC; 427/126, 35, 38, 331, 343, 58, 344, 352; 134/2, 4

[56] References Cited

UNITED STATES PATENTS

| | | | |
|---|---|---|---|
| 3,687,515 | 8/1972 | Haas et al. | 350/160 LC |
| 3,700,306 | 10/1972 | Eastmell et al. | 350/160 LC |
| 3,809,456 | 5/1974 | Goldmacher et al. | 350/160 LC |
| 3,843,233 | 10/1974 | Haas et al. | 350/160 LC |
| 3,853,391 | 12/1974 | Sorkin | 428/1 |
| 3,854,793 | 12/1974 | Kah | 350/160 LC |

OTHER PUBLICATIONS

Dixon et al., Aligment Mechanism . . . Layer, Appl. Phys. Letters, vol. 24, (No. 2), pp. 47–49, (1–1974).
Urbach et al., Alignment . . . Films, App. Phys. Let., vol. 25, (No. 9), pp. 179–181, (11–1974).

*Primary Examiner*—Michael F. Esposito
*Attorney, Agent, or Firm*—Booker T. Hogan, Jr.; W. H. MacAllister

[57] ABSTRACT

A method for aligning nematic liquid crystals on a coated substrate is disclosed. The method involves a pretreatment of the coated substrate with a mixture of a long chain alcohol and an amine at elevated temperatures. Liquid crystals applied to substrates treated by this process undergo orientation such that their directors are aligned perpendicular to the surface of the coated substrates.

8 Claims, No Drawings

MEANS FOR INDUCING PERPENDICULAR ALIGNMENT OF A NEMATIC LIQUID CRYSTAL ON A COATED SUBSTRATE

RELATED APPLICATIONS

In U.S. application Ser. No. 570,306 filed by applicant on Apr. 21, 1975 a method of aligning nematic liquid crystals on uncoated substrates to obtain a perpendicular orientation of the directors is disclosed. A combined chemical and physical process for inducing a tilted alignment of liquid crystals is disclosed in U.S. application Ser. Nos. 570,304 and 570,302 by J. Grinberg et al, filed Apr. 21, 1975. The inventions disclosed in each of the related applications have been assigned to Hughes Aircraft Company.

BACKGROUND OF THE INVENTION

1. Field of the Invention

This invention is related to the field of electro-optical systems in general and to the use of liquid crystals in electro-optical systems in particular.

2. Description of Prior Art

The utilization of nematic liquid crystals in the fabrication of electro-optical devices has been well established. For certain appications, it is desirable to orientate the directors of these crystals such that they are perpendicular to the surface of the substrates upon which they are placed. Prior art processes for aligning liquid crystals included the use of either soluble ionic alignment agents or polymeric surface coatings.

Ionic aligning agents included tetraalkylammonium salts (U.S. Pat. No. 3,656,834 by I. Haller et al dated Apr. 18, 1972), barium stearate (I. Haller, Appl. Phys. Lett. 24, 349[1974]), or lecithin (F. J. Kahn et al, Proc. IEEE 61, 823[1973]).

The use of polymeric silicone coatings to align liquid crystals has been reported by Kahn, et al., loc. cit. as has the use of a plasma-polymerized film (J. C. Dubois et al. Appl. Phys. Lett. 24, 297[1974]).

A soluble polyamide has also been used to align liquid crystals (W. Haas, et al., Phys. Rev. Lett. 25, 1326[1970]).

Each of the alignment processes disclosed above have been shown to yield orientated liquid crystals with some significant limitations. In the case of ionic alignment agents, the undesirable characteristic is the conductivity of the resulting mixture. Devices fabricated from liquid crystals oriented via a polymeric aligning agent have exhibited slow response times and in some cases poor alignment stability.

This invention allows one to fabricate electro-optic devices exhibiting the desirable characteristics of prior art and devices having oriented liquid crystals without the undesirable characteristics mentioned above.

THE INVENTIONS

SUMMARY

It has been discovered that perpendicular alignment of nematic liquid crystals, placed into an electro-optic device, can be achieved by treating the coated surfaces of the container prior to placing the liquid crystal therein.

A liquid crystal container or substrate surface coated with a metallic oxide or dioxide is treated with a mixture of a long-chain alcohol and an amine at an elevated temperature and washed with an inert organic solvent to remove excess alcohol and/or amine.

The treatment modifies the metallic oxide or dioxide surface leaving the latter coated with RO- groups, where RO— is derived from the alcohol.

Liquid crystals or liquid crystal mixtures subsequently placed in cntainers, or on substrates, wherein the coated surfaces have been so treated undergo alignment such that the directors of the crystals are perpendicular to the coated surfaces.

The main advantage of this invention is that it can be used to obtain perpendicular (homeotropic) alignment without increasing the conductivity of the liquid crystal, and without altering the properties of the liquid crystal in any way with a dissolved dopant, and without forming a relatively thick polymer coating on the substrate.

Crystals aligned on coated substrates treated with this invention have been found to be more stable than those aligned by prior art methods.

DETAILED DESCRIPTION

It is the object of this invention to provide a process whereby liquid crystals placed upon a coated substrate may be oriented such that the directors of the crystals are perpendicular to the surfaces of the substrates.

Substrates typically employed in electro-optic devices are coated with a metallic oxide or dioxide such as SiO and $SiO_2$. It has been found that when substrate surfaces coated with $SiO_2$ are treated with a mixture of an amine and a long chain alcohol, there is a residual surface coating comprised of RO groups from the alcohol which causes the directors of liquid crystals to undergo an orientation perpendicular to the surface of the coated substrate.

The invention is practiced by: preparing a mixture of a long chain aliphatic alcohol and an amine; placing the substrate with an $SiO_2$ surface in the alcohol-amine mixture and heating the same at a temperature of about 60° to 200° C, but preferably at a temperature of 100° to 150° C, for a period of at least several minutes, but preferably for one to 24 hours; removing the substrate and washing off any excess free or unreacted alcohol and amine with an inert organic solvent; and using the substrate to prepare a liquid crystal device in which the surface is in contact with the liquid crystals.

Suitable alcohols have the formula $CH_3\text{--}(CH_2\text{--})_n CH_2OH$ where $n \geq 10$. It is preferable to use 1-octadecanol, 1-hexadecanol, 1-tetradecanol, and 1-dodecanol, since these alcohols are readily available. Longer chain alcohols are acceptable but are generally more expensive or less readily available. Shorter chain alcohols are less desirable because they tend not to induce a true perpendicular alignment and, in fact, 1-dodecanol is marginal in this regard for some liquid crystals. Shorter alcohols can be used with some liquid crystals, however, as is exemplified by the fact that $n$ can be as low as 4 when the liquid crystal is p-methoxybenzylidene-p-n-butylaniline.

Any aliphatic amine is satisfactory for this invention, as long as it does not contain groups that would tend to depress the basicity of the amine. Primary amines are preferred and, as a practical matter, amines that have a low volatility at the temperature at which the treatment is carried out are preferred. Satisfactory amines include 1-octadecylamine, 1-hexadecylamine, 1-tetradecylamine, 1-dodecylamine, didodecylamine, tridodecylamine, N-methyloctadecylamine, N,N-dimethyloctadecylamine, and the like.

The substrate could conceivably consist of a piece of solid silica. However, as a practical matter, since most crystal devices rely on some means of applying an electrical field across a liquid crystal layer or film, the bulk of our experience has been obtained with transparent electrodes with a thin silica overcoating.

Such an electrode can consist of, for example, a glass plate having a coating of indium-tin oxide on at least a portion of its surface and an overcoating of $SiO_2$ ranging in thickness from about 100 A to several thousand angstroms. Such a thin, transparent $SiO_2$ coating can be deposited by standard techniques in a radio frequency plasma. For other applications it may be desirable to have an $SiO_2$ surface coating on a mirror, or some other substrate. The composition or structure of the substrate, other than its silica surface, is not material to this invention.

The treatment is believed to cause a reaction between the alcohol and hydroxyl groups on the silica surface, with the amine performing the function of a catalyst for this reaction. This can be depicted by the following equation:

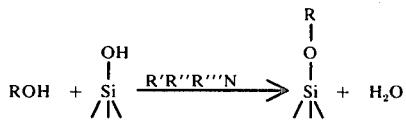

In this equation the silicon atom is part of the silica surface and is attached to other atoms in the silica coating.

A temperature of 60° C or higher may be used, but the treatment is marginally effective at 60° C. Temperatures above 100° C are preferred, probably because water, which is shown as a by-product in the above equation, is vaporized and driven from the alcohol-amine mixture. The upper temperature range is not important, except that it must not be so high that there is extensive thermal decomposition or oxidation of the organic components of the mixture. Temperatures in the range of 100° to 150° C are adequate. If the treatment is carried out in an open container, a practical upper temperature limit is the boiling point of the mixture. Normally it is not necessary to exclude air, although such exclusion will retard oxidation of the organic components.

An aligning effect with a substrate that had been in the hot alcohol-amine mixture for only 15 minutes at 60° C has been observed. However, it is preferable to continue the treatment for a period of at least one hour, to insure that a substantial fraction of the reactive surface sites have reacted. Obviously, the time required to complete the reaction to the desired extent is a function of the temperature and the concentration of the alcohol and of the amine.

It is convenient to use a mixture of the alcohol and the amine without any solvents or unreactive diluents, although the use of such solvents or diluents is not excluded. Obviously, the reaction can proceed more rapidly if no solvents or diluents are used. The ratio of alcohol to amine is not critical. Since the reaction probably involves one molecule of alcohol and one molecule of amine in bringing about a change at one surface site, it is preferred to use approximately equal molar quantities of alcohol and amine. If the molecular weights are not very much different, it is simple to use equal amounts by weight. An aligning effect has been observed when no amine was used, but this effect was marginal, and it is preferable to use substantial quantities of amine.

The treated substrate can be washed with any common inert organic solvent that dissolves the alcohol and the amine. Generally, a hydrocarbon solvent, such as hexane, has been used as the primary solvent. An alcohol solvent, such as methanol or ethanol, aids in the removal of excess alcohol and amine. Other solvents, such as ketone solvents, aromatic solvents, chlorinated hydrocarbon solvents, and the like, may also be used.

The composition of the liquid crystal is not material to this invention, except that shorter alcohols can be used with some liquid crystals, as has been mentioned. Nematic mixtures of esters have been used for most of this work, but they are not essential. If cholesteric liquid crystals are used, the aligning effect is such that the axis of the helix is oriented parallel to the surface. If the liquid crystal is a smectic material, the molecular axis will be oriented roughly perpendicular to the surface. The perpendicular or homeotropic alignment of nematic liquid crystals is of primary importance, however. The liquid crystal may contain dopants of various types if this is desired.

The following examples are provided to illustrate the practice of this invention.

I

Pieces of glass plate coated with indium-tin oxide ("Nesatron," available from PPG) were cleaned in an isopropyl alcohol degreaser, etched in chromic acid, and washed with water and with Transene. The cleaned indium-tin oxide surfaces were overcoated with $SiO_2$. These substrates were heated in a 1:1 mixture by weight of 1-hexadecanol and 1-hexadecylamine as follows: one hour at 100° to 130° C; 15 hours at 105° C; and five hours at 105° to 125° C. They were then washed thoroughly with (1) acetone, (2) methanol, and (3) hexane, and allowed to dry.

A cell was assembled using a nematic mixture of p-butoxyphenyl p-butoxybenzoate, p-butoxyphenyl p-hexyloxybenzoate, p-butoxyphenyl p-octyloxylbenzoate, and p-butylphenyl p-toluate in a ratio of 5:9:9:15 by weight. The liquid crystal was contained as a thin layer between two treated substrates separated by a ½ mil Mylar spacer at the periphery. The cell was examined with a polarizing microscope, and the optical axis (which coincides with the long axis of the molecules) was found to be aligned perpendicular to the surfaces of the substrates. Only a minimum amount of light was transmitted through the cell between crystals is of primary importance, however. The liquid crystal may contain dopants of various types if this is desired.

The following examples are provided to illustrate the practice of this invention.

II

Transparent, $SiO_2$-overcoated electrodes similar to those described in Example 1 were heated in each of the following materials and used to prepare liquid crystal cells:

| Cell | Compound or Mixture (1:1 by weight) | Temp., ° C | Time, Hrs. |
| --- | --- | --- | --- |
| A | 1-octadecanol + 1-octadecylamine | 120 | 17 |
| B | 1-dodecanol + didodecylamine | 120 | 17½ |
| C | 1-dodecanol + 1-dodecylamine | 120 | 18 |
| D | 1-hexanol + 1-hexylamine | 20–25 | 18½ |
| E | 1-hexadecanol | 125 | 21 |
| F | 1-hexadecylamine | 125 | 22½ |

The cells were prepared with a liquid crystal mixture similar to that described in Example 1 except that it was saturated with a conductive dopant, tetraethylammonium acetate. This dopant has no effect on the liquid crystal alignment. A ½ mil thick Mylar spacer was used. Examination under the polarizing microscope revealed the following results:

Cell A: Good perpendicular alignment; black between crossed polarizers.

Cell B: Very much tilted in various directions, although the alignment approached perpendicular; various shades of gray between crossed polars. This is of marginal value for true perpendicular alignment.

Cell C: Same as cell B.

Cell D: No perpendicular alignment; brightly colored between crossed polars. The orientation of the liquid crystal was similar to what would be obtained with an untreated substrate.

Cell E: When first viewed, the alignment was perpendicular. After six days the alignment was highly tilted in various directions.

Cell F: No perpendicular alignment; similar to cell D.

These results demonstrate that the 12-carbon alcohol is of marginal chain length for perpendicular alignment, and that longer aliphatic alcohols are superior. They also show that both primary and secondary amines can serve as catalysts, and that some alignment effect can even be obtained by heating the substrates with a long chain aliphatic alcohol without an amine. Treatment with the amine alone has no aligning effect.

III

Transparent electrodes similar to those of Example 1 and having a 1500 A thick $SiO_2$ coating were treated for one hour in a 1:1 mixture by weight of 1-hexadecanol and 1-hexadecylamine at various temperatures. The electrodes were then washed with methanol and with hexane and used to prepare liquid crystal cells. The liquid crystal was similar to that used in Example 1 except that it contained hexadecyltrimethylammonium stearate dopant at a level equal to 20% of saturation at room temperature; this dopant is also a perpendicular aligning agent, but at this concentration its aligning effect is small. The temperatures were as follows:

55° to 60° C
79° to 85 C°
102° C
117° to 121° C
138° C

When the cells were viewed between crossed polars under a microscope, they appeared marbled in different shades of gray, indicating some tilt in various directions. The tilt was less for those cells with electrodes treated at higher temperatures, the biggest different being found between the cells treated at 79° to 85° C and 102° C. It was concluded that the treatment should preferably be carried out over 100° C.

IV

Electrodes similar to those described in Example 1 were heated with a 1:1 mixture by weight of hexadecanol and hexadecylamine for three hours, then washed with methanol and hexane. A liquid crystal cell was assembled using a liquid crystal mixture similar to that of Example 1 except that it was approximately 50% saturated with tetrabutylammonium trifluoromethanesulfonate. This is a conductive dopant that does not influence alignment, and the liquid crystal mixture will not align perpendicular on an untreated substrate, but will assume a random orientation parallel to the surface. In the cell with treated electrodes, it aligned perpendicular with little or no tilt and no alignment defects.

V

Transparent $SiO_2$ overcoated electrodes similar to those described in Example I were heated in each of the following mixtures and used to prepare liquid crystal cells with N-(p-methoxybenzylidiene)-p-n-butylaniline containing 0.05% by weight tetrabutylammonium perchlorate:

| Cell | Alcohol (mixed with equal weight of 1-hexadecylamine) | Temp., ° C | Time, hr. |
| --- | --- | --- | --- |
| A | 1-tetradecanol | 116–123 | 20 |
| B | 1-dodecanol | 116–123 | 20 |
| C | 1-decanol | 116–123 | 20 |
| D | 1-nonanol | 110–140 | 23 |
| E | 1-octanol | 110–140 | 23 |
| F | 1-heptanol | 110–140 | 23 |
| G | 1-hexanol | ≈157°* | 20 |
| H | 1-pentanol | ~138°* | 20 |
| I | 1-butanol | ~138°* | 18 |

*reflux temperature of mixture

Cells A through G were aligned essentially perpendicular. In cell H the liquid crystal was tilted substantially away from the perpendicular, while in cell I the liquid crystal was poorly aligned.

Having described the invention with such particularity as to enable those skilled in the art to make and use it, the scope of the claims may now be understood as follows.

What I claim is:

1. A method of inducing the perpendicular or homeotropic alignment of liquid crystals on surfaces coated with an oxide of silica comprising cleaning the surfaces of said device via conventional means, treating the surface of said device with a mixture of an aliphatic alcohol taken from the group whose formula is $CH_3(CH_2)_nCH_2OH$ where $n$ is at least 2 and an amine at at a temperature of at least 60° C, washing said treated surface with an inert organic solvent and placing said surface in contact with the liquid crystals.

2. The method of claim 1 wherein said alcohol-amine mixture is comprised of approximately equal weight quantities of an aliphatic alcohol, whose formula is $CH_3(CH_2)_nCH_2OH$ where $n$ is equal to or greater than 10, and a primary aliphatic amine.

3. The method of claim 2 wherein said amine is a secondary aliphatic amine.

4. The method of claim 2 wherein said amine is a tertiary amine.

5. The method of claim 4 wherein said liquid crystals contain a conductive dopant.

6. The method of claim 1 wherein said surface is coated with $SiO_2$.

7. The method of claim 1 wherein the surface of said device are coated with a thin layer of silicon dioxide, said alcohol is an aliphatic alcohol taken from the group whose formula is $CH_3(CH_2)_nCH_2OH$ where $n$ is equal to or greater than 2, said amine is hexylamine and said liquid crystal is N-(p-methoxybenzylidine)-p-n-butylaniline.

8. The method of claim 6 wherein said surfaces are coated with indium-tin oxide and overcoated with silicon dioxide.

* * * * *